United States Patent
Shimada

[11] Patent Number: 6,097,815
[45] Date of Patent: Aug. 1, 2000

[54] METHOD OF AND AN APPARATUS FOR GENERATING PSEUDO-RANDOM NUMBERS

[75] Inventor: Michio Shimada, Tokyo, Japan

[73] Assignee: NEC Corporation, Tokyo, Japan

[21] Appl. No.: 09/130,658

[22] Filed: Aug. 7, 1998

[30] Foreign Application Priority Data

Aug. 7, 1997 [JP] Japan .................................. 9-224416

[51] Int. Cl.[7] ...................................................... H04L 9/26
[52] U.S. Cl. ........................ 380/46; 380/265; 708/250; 708/252
[58] Field of Search .................... 708/252, 250; 380/46, 265

[56] References Cited

U.S. PATENT DOCUMENTS

| | | | |
|---|---|---|---|
| 3,548,174 | 12/1970 | Knuth | 708/250 |
| 4,493,056 | 1/1985 | Watanabe | 708/252 |
| 4,667,301 | 5/1987 | Chiu et al. | 708/250 |
| 5,301,235 | 4/1994 | Shimada | 380/42 |
| 5,317,528 | 5/1994 | Gofman | 708/250 |
| 5,420,928 | 5/1995 | Aiello et al. | 380/46 |
| 5,541,996 | 7/1996 | Ridenour | 380/46 |
| 5,640,455 | 6/1997 | Shimada | 380/42 |

FOREIGN PATENT DOCUMENTS 8-95490 4/1996 Japan .
8-129480 5/1996 Japan .

OTHER PUBLICATIONS

Kato, Basic Cryptography I, "Information & Computing, ex.–3," pub. by Science ltd., (Sep. 1989), pp. 168–187.

Shimada, "Multiple–Modulus Cryptosystem", A–258, (1996), pp 260.

*Primary Examiner*—Gilberto Barron, Jr.
*Attorney, Agent, or Firm*—Foley & Lardner

[57] ABSTRACT

To provide an apparatus for generating pseudo-random numbers at a high speed with sufficient cryptographical security, the apparatus comprises: a T-ary counter (101) for generating a count number from 0 to T−1 cyclically by incrementing the count number in synchronization with a clock signal; a modulus memory (103) for outputting a prime number read out from T prime numbers prepared therein according to a value of the count number; an n-bit register (102) for registering and outputting an n-bit value in synchronization with the clock signal; an expanded affine transformation circuit (104) for outputting an intermediate number, by performing expanded affine transformation of the n-bit value registered in the n-bit register (102) according to the prime number, the n-bit value being revised with the intermediate number in synchronization with the clock signal; and a demagnification circuit (105) for outputting certain s bits of the intermediate number as one of the pseudo-random numbers in synchronization with the clock signal.

7 Claims, 3 Drawing Sheets

METHOD OF AND AN APPARATUS FOR GENERATING PSEUDO-RANDOM NUMBERS

BACKGROUND OF THE INVENTION

The present invention relates to a method of and an apparatus for generating pseudo-random numbers which are convenient to be used for a stream cipher system, for example, to be applied to communication systems or information processing systems. In the stream cipher system, the pseudo-random numbers are multiplied onto data streams taking XOR (exclusive OR) logic between them for hindering unpermitted persons from reading contents of communication data or data stored in recording media.

A method called the congruential method, or the multiplicative congruential method (in the following paragraphs, simply called the congruential method) is a well-known and widely used method of generating the pseudo-random numbers, wherein a series of pseudo-random numbers $X(1)$, $X(2)$, . . . are generated by calculating $X(j)=\{AX(i-1)+B\}$ (mod P), sequentially.

In the conventional congruential method, a fixed number, which is determined considering word length of a computer, for example, is used for the modulus P, and it is not changed according to pseudo-random numbers to be generated, such as $P=2^{32}$ in a 32-bit computer.

Details of this congruential method is described in "Basic Cryptography I", by Kato, Information & Computing, ex.-3, published by Science Ltd., (September, 1989), for example. Further, a modification of the congruential method is disclosed in a Japanese Patent application laid open as a Provision Publication No. 129480/'96, wherein the parameters A and B are changed according to signals supplied from outside.

However, there exists a linear relation among a series of pseudo-random numbers generated according to the congruential method. Therefore, by resolving simultaneous linear equations obtained from an observed series of pseudo-random numbers, an initial value $X(0)$ of the observed series may be estimated even when their parameters A and B are kept unknown.

Furthermore, there is also a problem in the conventional congruential method that the cryptographic security may not be sufficiently retained even when the pseudo-random numbers are generated by varying parameters A and B, as follows. (Here, the cryptographical security means difficulties to obtain the initial value $X(0)$ of an observed series of the pseudo-random numbers.)

Suppose to generate the pseudo-random numbers by varying the parameters A and B periodically, according to an equation $X(j)=\{A(j(\mod T)) \cdot X(j-1)+B(j(\mod T))\}(\mod P))$, for example, by preparing T sets of parameters $\{A(k), B(k)\}(k=1, 2, \ldots, T)$. However, once the series of the pseudo-random numbers $X(j)$ $(j=1, 2, \ldots)$ thus generated is sampled by a period T, the sampled series $X(iT+k)$ $(i=1, 2, \ldots)$ is nothing but a series generated according to a simple congruential method with fixed parameters $\{A(k), B(k)\}$.

Still Further, when the pseudo-random numbers are used for the stream cipher system, the same pseudo-random numbers should be generated both at the transmitter side and the receiver side separated a long way off from each other. Therefore, it is difficult to vary the parameters A and B at random and simultaneously as well according to the same external signal.

Therefore, sufficient security of correspondence cannot be retained with the stream cipher system when the pseudo-random numbers are generated according to the conventional congruential method, even though the pseudo-random numbers themselves may be generated at a high speed.

PRINCIPLE OF THE INVENTION

Therefore, a primary object of the present invention is to provide a method of and an apparatus for generating pseudo-random numbers at a high speed to be used for the stream cipher system with sufficient cryptographical security, and to provide a recording medium wherein is recorded a program for generating the pseudo-random numbers making use of a computer.

In order to achieve the object, the pseudo-random numbers are generated basically in the same way as the conventional congruential method, but by varying the modulus P, in the present invention.

As will be described afterwards, the pseudo-random numbers generated by varying the modulus P have sufficient cryptographical security.

However, according to the conventional congruential method, each individual value of the pseudo-random numbers takes a value between 0 and P−1. Therefore, when the modulus P is varied, the uniform distribution of the pseudo-random numbers, a uniform distribution between 0 and $2^{32}-1$ when $P=2^{32}$, for example, cannot be obtained. The pseudo-random numbers of a deformed distribution is not only cryptographically weak but also inconvenient to be used for a game machine, for example. This is a reason the modulus P is fixed in the conventional congruential method.

Therefore, an expanded affine transformation is used in the present invention in place of the affine transformation $\{AX+B\}(\mod P)$ of the congruential method, for obtaining the uniform distribution of the generated pseudo-random numbers.

The expanded affine transformation is represented by $E_{A,B,P}(X)$ defined by following equations;

$$f_{A,B,P}(X) = \begin{cases} \{AX + B\}(\mod P) & (\text{if } X < P) \\ X & (\text{if } X \geq P), \end{cases}$$

$$g(X) = X \wedge 2^{n-1},$$

$$E_{A,B,P}(X) = f_{A,B,P}(g(f_{A,B,P}(X))).$$

Here, $\wedge$ represents a binary operation obtaining XOR logic of each corresponding two figures, and n is a bit-length of P.

In the invention, three constants A, B and T, T prime numbers $P(0), P(1), \ldots, P(T-1)$ and an initial number $X(0)$ are prepared, and a series of pseudo-random numbers $X(j)$ is calculated according to following equation (1);

$$X(j)=E_{A,B,P(\{j-1\}(\mod T))}(X(j-1)), j=1, 2, \quad (1)$$

By thus calculating, the pseudo-random numbers $X(j)$ having a uniform distribution in a range from 0 to $2^n-1$ can be obtained, when any n-bit prime number is assigned to any of the T modulus $P(0), P(1), \ldots, P(T-1)$.

The expanded affine transformation is applied in a crypto-function for generating block ciphers called the multiple-modulus cryptographs, such as disclosed in a Japanese patent application laid open as a Provisional Publication No. 95490/'96, or in "Multiple-Modulus Cryptosystem" by Shimada, p. 260, A-258, proceedings of 1996 General Congress of the IEICE.

In the pseudo-random numbers generated according to the expanded affine transformation, a T-th pseudo-random number X(T) becomes equivalent to a number obtained by processing an initial number X(0) T times through the multiple-modulus crypto-function making use of crypto-keys P(0), P(1), . . . , P(T−1). Therefore, even if a series of the pseudo-random numbers is sampled by the period T, the sampled series X(iT+k) (i=1, 2, . . . ) retains sufficient cryptographical security.

However, even though the cryptographical security is retained in the sampled series X(iT+k), it is not in the original series X(j) (j=1, 2, . . . ). An initial value X(0) of an original series can be still estimated by resolving simultaneous equations obtained from the observed original X(j). Therefore, the sufficient cryptographical security cannot be obtained only through the expanded affine transformation.

In order to deal with this problem, only a part of the numbers obtained by the expanded affine transformation is output as the pseudo-random numbers, in the invention. For example, calculating X(j) of 64-bit digit, certain 8 bits of the X(j) are output to be used as the pseudo-random numbers.

As above described, the sampled series X(iT+k) (i=1, 2, . . . ) has sufficient cryptographical security and can be regarded as unknown variables. Therefore, by outputting but a part of X(j) (j=1, 2, . . . ), information necessary for resolving the simultaneous equations is made to lack, making unable to estimate the initial number X(0).

By outputting an order of n/T bits from X(j) of n-bit digit, as mach security as T times multiple-modulus crypto-processing can be obtained, which may satisfy almost any case. However, the output bit length may be increased or reduced considering necessary security levels.

As to the congruential method, an approximate cycle of a series of pseudo-random numbers can be theoretically evaluated according to transformation parameters. On the other hand, it is considered to be difficult to make theoretical estimation of the cycle of the pseudo-random numbers generated according to the invention, or there has been found no evaluation method thereof until now.

However, at least it can be said that the pseudo-random numbers according to the invention should have a sufficiently long cycle, because the sampled series X(iT+k) (i=1, 2, . . . ) is a series to be obtained by repeating the multiple-modulus crypto-processing many times and the multiple-modulus cryptograph itself is known to have sufficiently effective random characteristic.

SUMMARY OF THE INVENTION

In order to realize the above principle, a method of generating pseudo-random numbers of the present invention comprises:

a step of reading out a prime number from a series of prime numbers prepared in a modulus memory cyclically in synchronization with a clock signal;

a step of calculating an intermediate number of n bits by performing expanded affine transformation of an n-bit value registered in an n-bit register according to the prime number, and revising the n-bit value with the intermediate number in synchronization with the clock signal, n being a positive integer; and a step of outputting certain s bits of the intermediate number as one of the pseudo-random numbers in synchronization with the clock signal, s being a positive integer not more than n.

And, an apparatus of the present invention for generating pseudo-random numbers comprises:

a T-ary counter for generating a count number from 0 to T−1 cyclically by incrementing the count number in synchronization with a clock signal, T being an positive integer;

a modulus memory for outputting a prime number read out from T prime numbers prepared therein according to a value of the count number;

an n-bit register for registering and outputting an n-bit value in synchronization with the clock signal, no being a positive integer;

an expanded affine transformation circuit for outputting an intermediate number, by performing expanded affine transformation of the n-bit value registered in the n-bit register according to the prime number, the n-bit value being revised with the intermediate number in synchronization with the clock signal; and a demagnification circuit for outputting certain s bits of the intermediate number as one of the pseudo-random numbers in synchronization with the clock signal, s being a positive integer not more than n.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
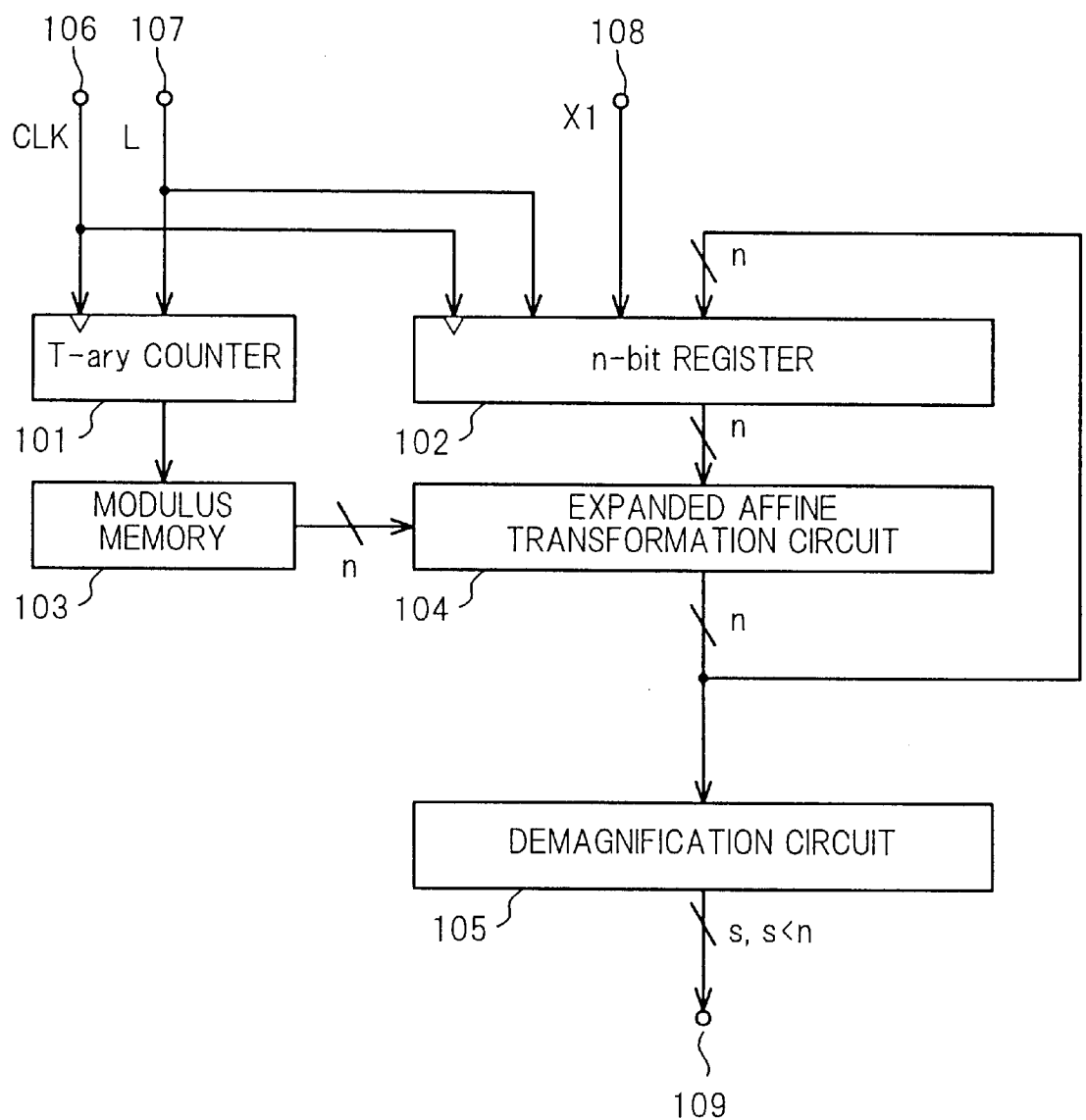
FIG. 1 is a block diagram illustrating a functional configuration of an apparatus according to a first embodiment of the invention.

FIG. 1 is a block diagram illustrating a functional configuration of an apparatus according to a first embodiment of the invention, comprising a T-ary counter 101, an n-bit register 102, a modulus memory 103, an expanded affine transformation circuit 104 and a demagnification circuit 105.

The T-ary counter 101 resets a count value thereof to zero in synchronization with a clock signal CLK supplied to a clock terminal 106 during a control signal L supplied to a control terminal 107 is disabled, and incrementing the count value, or returning the count value to zero when the counter value is T−1, in synchronization with the clock signal CLK during the control signal L is enabled.

The n-bit register 102 registers an initial value XI supplied from an input terminal 108 in synchronization with the clock signal CLK during the control signal L is disabled, and registers output of the expanded affine transformation circuit 104 in synchronization with the clock signal CLK during the control signal L is enabled.

The registered n-bit value is supplied to the expanded affine transformation circuit 104.

In the modulus memory 103, there are prepared T prime numbers P(0), P(1), . . . , P(T−1), whereof P(k) is read out as a prime number P to be supplied to the expanded affine transformation circuit 104 when the count value of the T-ary counter 101 is k (k=0, 2, . . . , T−1).

The expanded affine transformation circuit 104 performs the expanded affine transformation of the n-bit value registered in the n-bit register 102 according to the equation (1) making use of the prime number P supplied from the modulus memory 103 and outputs the expanded affine transformation $E_{A,B,P}$.

Here, the transformation parameters A and B are set to predetermined values.

The demagnification circuit 105 demagnifies the n-bit output of the expanded affine transformation circuit 104 into a s-bit value to be output as a pseudo-random number from an output terminal 109. The bit length s is determined as s<n according to required theoretical security, or s=n when the required theoretical security is not so strict.

As to the demagnification, it is generally performed by processing a "one-to-one conversion", which will be described afterward, onto certain s bits extracted from the n-bit value. However, the extracted certain s bits may be output directly as they are, for simplifying the circuit configuration.

Figure 2:
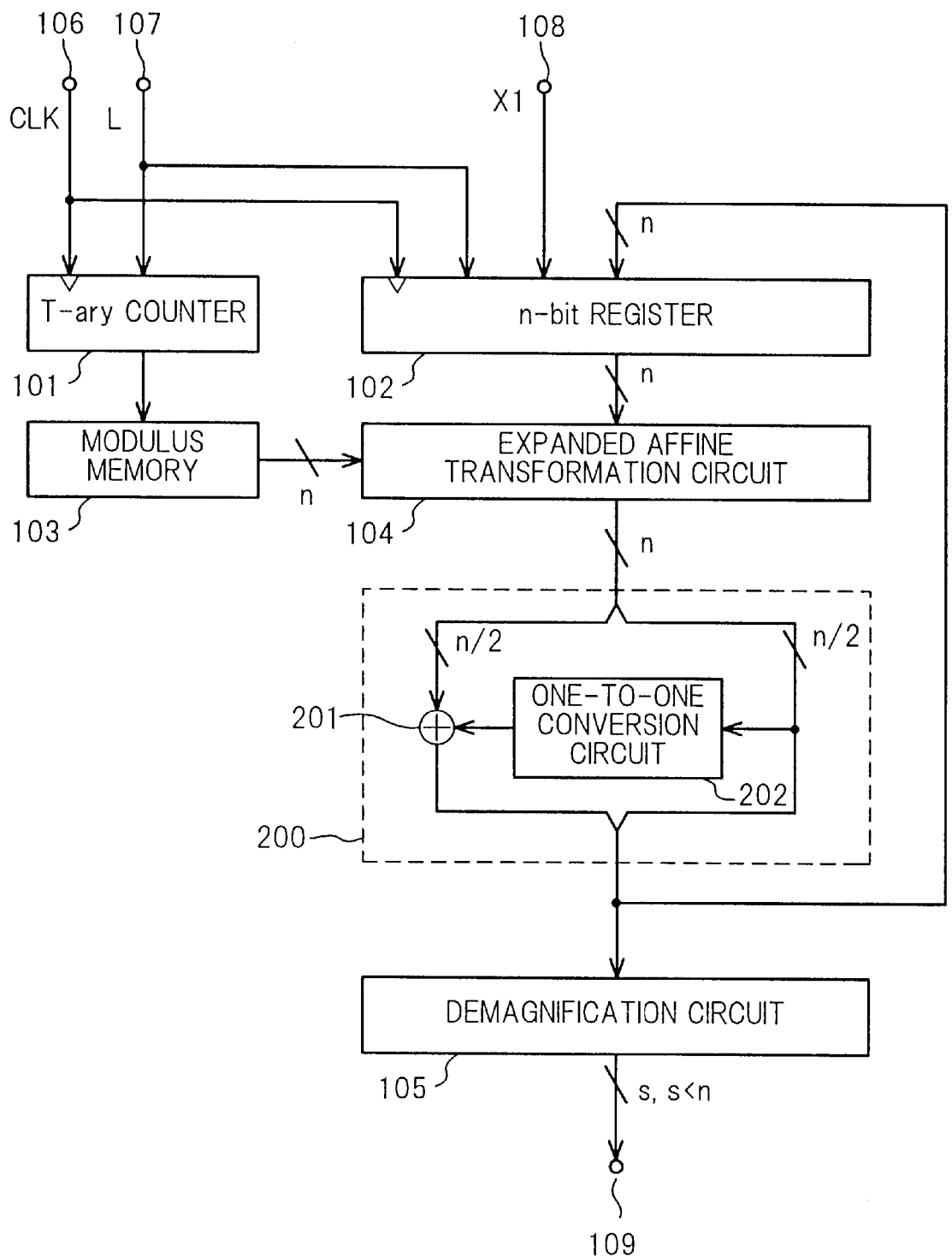
FIG. 2 is a block diagram illustrating another functional configuration of an apparatus according to a second embodiment of the invention.

FIG. 2 is a block diagram illustrating another functional configuration of an apparatus according to a second embodiment of the invention, wherein a mixing circuit 200 including an XOR circuit 201 and a one-to-one conversion circuit 202 is inserted between the expanded affine transformation circuit 104 and the demagnification circuit 105 of FIG. 1 for performing a mixing process to the output of the expanded affine transformation circuit 104, and the n-bit register 102 registers output of the mixing circuit 200 in synchronization with the clock signal CLK during the control signal L is enabled.

In the mixing circuit 200, lower n/2 bits, for example, of the n-bit output of the expanded affine transformation circuit 104 are processed with a "one-to-one conversion" through the one-to-one conversion circuit 202.

Here, the "one-to-one conversion" means to convert logic of each bit of a bit sequence retaining reversibility of the conversion, that is, to convert a first bit sequence into a second bit sequence of the same bit-number so as to be able to be restored into the first bit sequence through an inverse "one-to-one conversion".

Returning to FIG. 2, the XOR circuit 201 outputs XOR logic of each corresponding two figures of the upper n/2 bits of the n-bit output of the expanded affine transformation circuit 104 and output of the one-to-one conversion circuit 202, as upper n/2 bits of output of the mixing circuit 200, whereof lower n/2 bits are supplied directly with the same of the n-bit output of the expanded affine transformation circuit 104.

Thus processing by way of the mixing circuit 200, the mixing characteristic, and consequently, the distribution uniformity of the pseudo-random numbers can be still improved.

As to the one-to-one conversion circuit 202, any appropriate "one-to-one conversion", as above described, may be performed there, and, here too, the input bit sequence may be output directly as they are, for simplifying the circuit configuration.

Figure 3:
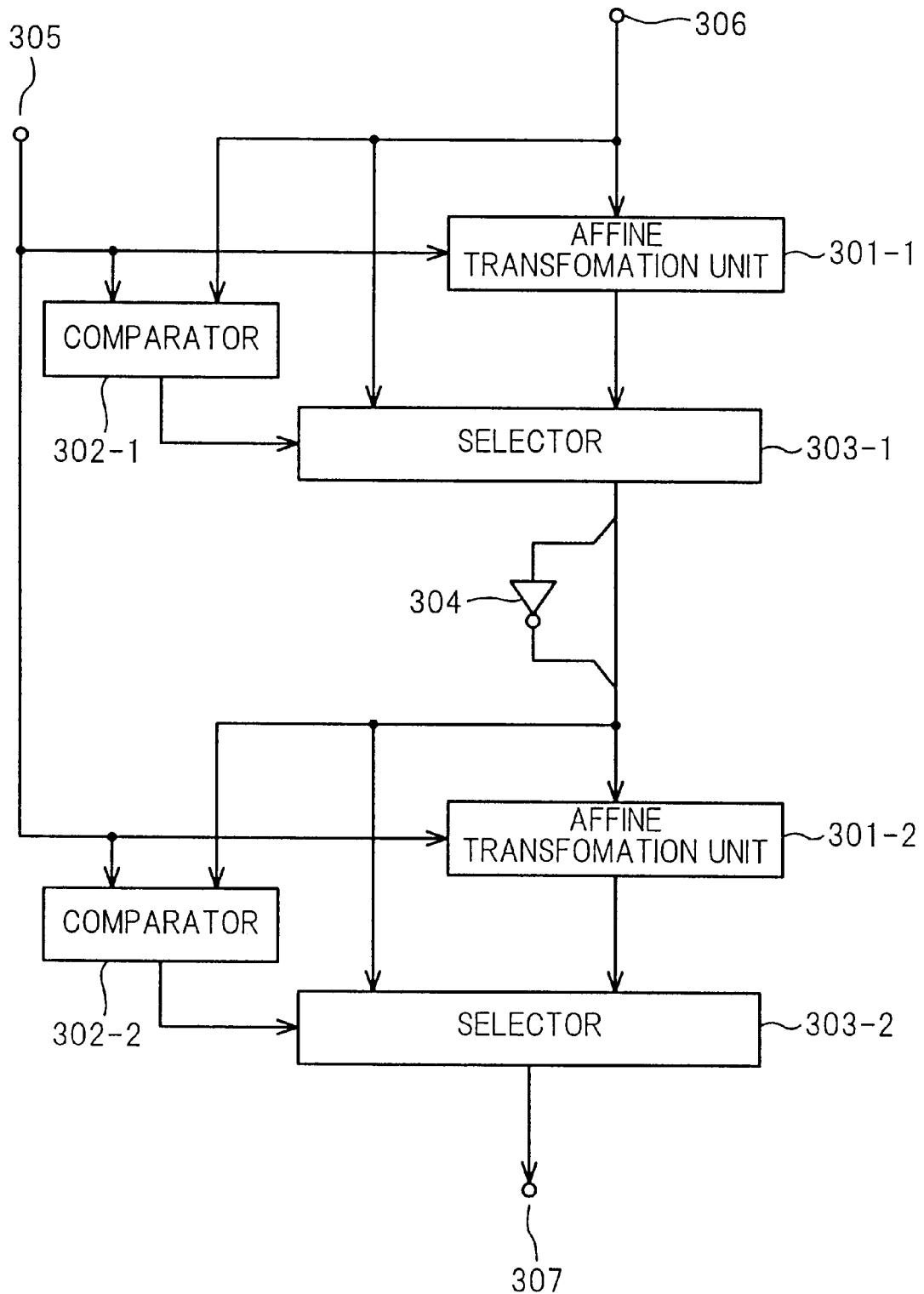
FIG. 3 is a block diagram illustrating the expanded affine transformation circuit 104 of FIGS. 1 and 2.

Now, the expanded affine transformation circuit 104 of FIGS. 1 and 2 is described referring to a block diagram of FIG. 3, wherein a prime number P output of the modulus memory 103 is supplied to an input terminal 305, the n-bit value M registered in the n-bit register 102 is supplied to another input terminal 306, and the expanded affine transformation $E_{A,B,P}$ is output through an output terminal 307.

The expanded affine transformation circuit 104 comprises a first and a second affine transformation unit 301-1 and 301-2, a first and a second comparator 302-1 and 302-2, a first and a second selector 303-1 and 303-2 and an inverter 304.

The first affine transformation unit 301-1 calculates an affine transformation {AM+B}(mod P) of the n-bit value M according to the prime number P supplied from the modulus memory 103. Here, A and B are predetermined constants, as beforehand described. The first comparator 302-1 compares the n-bit value M to the prime number P, and controls the first selector 303-1 according to the comparison result. The first selector 303-1 selects the n-bit value M when M≧P, or the prime number P when M<P, controlled by the first comparator 302-1.

The inverter 304 inverts a highest bit of the n-bit value output from the first affine transformation unit 301-1 for obtaining a modified number N or n bits.

The second affine transformation unit 301-2 calculates an affine transformation {AN+B}(mod P) of the modified number N according to the same prime number P. The second comparator 302-2 compares the modified number N to the prime number P, and controls the second selector 303-2 according to the comparison result. The second selector 303-2 selects the modified number N when N≧P, or the prime number P when N<P, controlled by the second comparator 302-2, which is output as the expanded affine transformation $E_{A,B,P}$ of the expanded affine transformation circuit 104.

Heretofore, the embodiments of the invention are described in connection with FIGS. 1 to 3, wherein each functional block is depicted separately. However, it goes without saying that each corresponding function may be realized separately or in combination by software recorded in a recording medium to be implemented in a computer.

As heretofore described, a series of pseudo-random numbers of s bits having high cryptographical security can be generated at high speed according to the invention, by performing one time of expanded affine transformation and one time demagnification for each of the pseudo-random numbers. Further, information necessary for estimating unknown values is made to lack from observable series of the pseudo-random numbers, by using only a part of output of the expanded affine transformation as the pseudo-random numbers.

Therefore, a high-speed and a high-security can be obtained as a pseudo-random number generator to be applied preferably to the stream cipher system, according to the invention.

What is claimed is:

1. A method of generating pseudo-random numbers, said method comprising:

a step of reading out a prime number from a series of prime numbers prepared in a modulus memory cyclically in synchronization with a clock signal;

a step of calculating an intermediate number of n bits by performing expanded affine transformation of an n-bit value registered in an n-bit register according to the prime number, and revising the n-bit value with the intermediate number in synchronization with the clock signal, no being a positive integer; and a step of outputting certain s bits of the intermediate number as one of the pseudo-random numbers in synchronization with the clock signal, s being a positive integer not more than n.

2. A method of generating pseudo-random numbers as recited in claim 1; said step of calculating an intermediate number further comprising a step of performing mixing process on a result of the expanded affine transformation for obtaining the intermediate number.

3. A method of generating pseudo-random numbers as recited in claim 2; wherein:

n is an even positive integer; and said mixing process is a process wherein logic of each of upper n/2 bits of the intermediate number is obtained from XOR (exclusive OR) logic of each corresponding two figures of upper n/2 bits of the result of the expanded affine transformation and n/2 bits obtained by performing a one-to-one conversion to lower n/2 bits of the result, and logic of each of lower n/2 bits of the intermediate number is obtained from logic of corresponding each of the lower n/2 bits of the result.

4. An apparatus for generating pseudo-random numbers; said apparatus comprising:

a T-ary counter for generating a count number from 0 to T−1 cyclically by incrementing the count number in synchronization with a clock signal, T being an positive integer;

a modulus memory for outputting a prime number read out from T prime numbers prepared therein according to a value of the count number;

an n-bit register for registering and outputting an n-bit value in synchronization with the clock signal, n being a positive integer;

an expanded affine transformation circuit for outputting an intermediate number, by performing expanded affine transformation of the n-bit value registered in the n-bit register according to the prime number, the n-bit value being revised with the intermediate number in synchronization with the clock signal; and a demagnification circuit for outputting certain s bits of the intermediate number as one of the pseudo-random numbers in synchronization with the clock signal, s being a positive integer not more than n.

5. An apparatus for generating pseudo-random numbers; said apparatus comprising:

a T-ary counter for generating a count number from 0 to T−1 cyclically by incrementing the count number in synchronization with a clock signal, T being an positive integer;

a modulus memory for outputting a prime number read out from T prime numbers prepared therein according to a value of the count number;

an n-bit register for registering and outputting an n-bit value in synchronization with the clock signal, n being an even positive integer;

an expanded affine transformation circuit for outputting an expanded affine transformation of the n-bit value registered in the n-bit register according to the prime number;

a mixing circuit for outputting an intermediate number whereby the the n-bit value registered in the n-bit register is revised in synchronization with the clock signal, said mixing circuit having a one-to-one conversion circuit for obtaining n/2 bits by performing a one-to-one conversion to lower n/2 bits of the expanded affine transformation, and an XOR circuit for obtaining upper n/2 bits of the intermediate number from XOR logic of each corresponding two figures of upper n/2 bits of the expanded affine transformation and the n/2 bits obtained by the one-to-one conversion circuit, lower n/2 bits of the intermediate number being obtained from the lower n/2 bits of the the expanded affine transformation; and a demagnification circuit for outputting certain s bits of the intermediate number as one of the pseudo-random numbers in synchronization with the clock signal, s being a positive integer not more than n.

6. A recording medium wherein a program is recorded; said program being used for a computer performing:

a step of reading out a prime number from a series of prime numbers prepared in a modulus memory cyclically in synchronization with a clock signal;

a step of calculating an intermediate number of n bits by performing expanded affine transformation of an n-bit value registered in an n-bit register according to the prime number, and revising the n-bit value with the intermediate number in synchronization with the clock signal, n being a positive integer; and a step of outputting certain s bits of the intermediate number as one of the pseudo-random numbers in synchronization with the clock signal, s being a positive integer not more than n.

7. A recording medium wherein a program is recorded; said program being used for a computer performing:

a step of reading out a prime number from a series of prime numbers prepared in a modulus memory cyclically in synchronization with a clock signal;

a step of obtaining an expanded affine transformation of an n-bit value registered in an n-bit register according to the prime number;

a step of calculating an intermediate number of n bits by performing a mixing process to the expanded affine transformation, and revising the n-bit value with the intermediate number in synchronization with the clock signal, n being an even positive integer, and said mixing process being a process wherein logic of each of upper n/2 bits of the intermediate number is obtained from XOR logic of each corresponding two figures of upper n/2 bits of the expanded affine transformation and n/2 bits obtained by performing a one-to-one conversion to lower n/2 bits of the expanded affine transformation, and logic of each of lower n/2 bits of the intermediate number is obtained from logic of corresponding each of the lower n/2 bits of the expanded affine transformation; and a step of outputting certain s bits of the intermediate number as one of the pseudo-random numbers in synchronization with the clock signal, s being a positive integer not more than n.

* * * * *